United States Patent
Ueda et al.

(10) Patent No.: US 9,115,921 B2
(45) Date of Patent: Aug. 25, 2015

(54) PERFORMANCE EVALUATION DEVICE FOR VARIABLE-SPEED CENTRIFUGAL CHILLER

(75) Inventors: Kenji Ueda, Tokyo (JP); Yoshie Togano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1080 days.

(21) Appl. No.: 12/763,699

(22) Filed: Apr. 20, 2010

(65) Prior Publication Data

US 2011/0120162 A1    May 26, 2011

(30) Foreign Application Priority Data

Nov. 20, 2009  (JP) ................................. 2009-265296

(51) Int. Cl.
*G01L 3/26* (2006.01)
*F25B 49/02* (2006.01)
(Continued)

(52) U.S. Cl.
CPC ............... *F25B 49/025* (2013.01); *F25B 1/053* (2013.01); *F25B 1/10* (2013.01); *F25B 25/005* (2013.01);
(Continued)

(58) Field of Classification Search
CPC ......... G01L 3/26; G01L 25/006; F25B 49/02; F25B 2500/19; G06F 17/10
USPC ......... 62/79, 99, 115, 126, 129, 228.1, 228.5, 62/498, 509, 510, 512, 513, 185, 201, 500, 62/228.3; 702/182, 183, 300, 99; 417/212, 417/213, 250; 701/31.7, 100; 703/2, 9
See application file for complete search history.

(56) References Cited

U.S. PATENT DOCUMENTS 4,420,947 A * 12/1983 Yoshino ........................... 62/160
4,768,346 A *  9/1988 Mathur ............................ 62/127

(Continued)

FOREIGN PATENT DOCUMENTS

CN    1629495 A   6/2005
JP    4-80578 A   3/1992

(Continued)

OTHER PUBLICATIONS

Ronald Lapina, How to use performance curves to evaluate behavior of centrifugal compressors, Jan. 25, 1982, Procon, Inc, see all pages.*

(Continued)

*Primary Examiner* — Frantz Jules
*Assistant Examiner* — Meraj A Shaikh
(74) *Attorney, Agent, or Firm* — Westerman, Hattori, Daniels & Adrian, LLP

(57) ABSTRACT

An object is to sequentially calculate planned COPs. Provided is a performance evaluation device for a variable-speed centrifugal chiller that includes a data acquisition unit that acquires operating data of the variable-speed centrifugal chiller as input data; a storage unit that stores a first arithmetic equation derived on the basis of mechanical characteristics of the chiller and used for calculating a relative load factor that relatively expresses a relationship between a current load factor at a current coolant inlet temperature and a predetermined load factor at a predetermined coolant inlet temperature set as a reference operating point, a second arithmetic equation that expresses a relationship between the relative load factor and a correction coefficient, and a third arithmetic equation used for calculating a planned COP by using the correction coefficient to correct a COP calculation equation derived from a reverse Carnot cycle; and an arithmetic unit that calculates the planned COP under current operating conditions by using the operating data acquired by the data acquisition unit in the first, second, and third arithmetic equations stored in the storage unit.

6 Claims, 11 Drawing Sheets

(51) Int. Cl.
*F25B 1/053* (2006.01)
*F25B 1/10* (2006.01)
*F25B 25/00* (2006.01)
*F25B 40/02* (2006.01)

(52) U.S. Cl.
CPC .......... *F25B 40/02* (2013.01); *F25B 2339/047* (2013.01); *F25B 2341/0662* (2013.01); *F25B 2400/072* (2013.01); *F25B 2400/13* (2013.01); *F25B 2400/23* (2013.01); *F25B 2600/021* (2013.01); *F25B 2700/195* (2013.01); *F25B 2700/197* (2013.01); *F25B 2700/21161* (2013.01); *F25B 2700/21163* (2013.01); *F25B 2700/21171* (2013.01); *Y02B 30/741* (2013.01)

(56) References Cited

U.S. PATENT DOCUMENTS

| | | | |
|---|---|---|---|
| 4,885,914 A * | 12/1989 | Pearman | 62/129 |
| 5,083,438 A | 1/1992 | McMullin | |
| 7,412,841 B2 * | 8/2008 | Ueda et al. | 62/228.3 |
| 7,966,152 B2 * | 6/2011 | Stluka et al. | 702/182 |
| 8,132,421 B2 * | 3/2012 | Ueda | 62/209 |
| 2005/0144965 A1 * | 7/2005 | Ueda et al. | 62/228.1 |
| 2006/0242992 A1 * | 11/2006 | Nicodemus | 62/500 |
| 2010/0180629 A1 | 7/2010 | Ueda et al. | |
| 2011/0120162 A1 | 5/2011 | Ueda et al. | |

FOREIGN PATENT DOCUMENTS

| | | | |
|---|---|---|---|
| JP | 4-93567 A | | 3/1992 |
| JP | 11-23113 A | | 1/1999 |
| JP | 11-153371 A | | 6/1999 |
| JP | 2001-336805 A | | 12/2001 |
| JP | 2003-186947 A | | 7/2003 |
| JP | 2005-114295 A | | 4/2005 |
| JP | 2006-125275 A | | 5/2006 |
| JP | 2009-204262 A | | 9/2009 |
| JP | 2010-43826 A | | 2/2010 |
| KR | 10-0466433 B1 | | 1/2005 |
| KR | 10-0511934 B1 | | 9/2005 |
| KR | 10-0776324 B1 | | 11/2007 |
| WO | 2008/142714 A1 | | 11/2008 |
| WO | 2009/107295 A1 | | 9/2009 |

OTHER PUBLICATIONS

Korean Decision to Grant a Patent dated Aug. 1, 2012, issued in corresponding Korean patent application No. 10-2010-0034271.
Korean Office Action dated Nov. 11, 2011, issued in correspponding Korean Patent Application No. 2010-0034271.
Extended European Search Report dated Nov. 21, 2012, issued in corresponding European Patent Application No. 10160661.4.
Chinese Decision to Grant dated Dec. 5, 2012, issued in corresponding Chinese Patent Application No. 201010170046, (2 pages).
Notice of Allowance dated Apr. 23, 2014, mailed in U.S. Appl. No. 13/043,013 (7 pages).
Communication under Rule 71(3) EPC Invitiation to Pay the Fee for Grant dated Sep. 4, 2014, issued in corresponding EP Application No. 10 160 661.4 (7 pages).
European Decision to Grant a Patent dated Jan. 22, 2015, issued in corresponding EP Patent Application No. 10160661.4 (2 pages).
Japanese Decision to Grant a Patent dated Nov. 5, 2013, issued in corresponding Japanese Patent Application No. 2009-265296 with English translation (6 pages).
U.S. Office Action dated Jan. 2, 2014 of U.S. Appl. No. 13/043,013 (9 pages).
Korean Decision to Grant a Patent dated Jul. 18, 2012, issued in Korean Patent Application No. 10-2011-0001606, w/ English translation (2 pages).
Chinese Office Action dated Jun. 5, 2013, issued in Chinese Patent Application No. 201110026955.0 with English translation (11 pages).
Chinese Decision to Grant a Patent dated Dec. 4, 2013, issued in Chinese Patent Application No. 201110026955.0 (2 pages) "The Decision to Grant a Patent has been received".
U.S. Non-Final Office Action dated Sep. 10, 2013, issued in related U.S. Appl. No. 13/043,013 (22 pages).
Japanese Decision to Grant a Patent dated Mar. 11, 2014, issued in Japanese Patent Application No. 2010-170665 with English translation (6 pages).

* cited by examiner

FIG. 5

| LOAD FACTOR Qf | | LOAD FACTOR Qf | | | | |
|---|---|---|---|---|---|---|
| | | 1 | 0.8 | 0.6 | 0.4 | 0.2 |
| COOLANT INLET TEMPERATURE | 32 | 1.00 | 0.80 | 0.60 | 0.40 | 0.20 |
| | 29 | 1.00 | 0.80 | 0.60 | 0.40 | 0.20 |
| | 25 | 1.00 | 0.80 | 0.60 | 0.40 | 0.20 |
| | 20 | 1.00 | 0.80 | 0.60 | 0.40 | 0.20 |
| | 15 | 1.00 | 0.80 | 0.60 | 0.40 | 0.20 |
| | 13 | 1.00 | 0.80 | 0.60 | 0.40 | 0.20 |

FIG. 9

| RELATIVE LOAD FACTOR Qfr | | LOAD FACTOR Qf | | | | |
|---|---|---|---|---|---|---|
| | | 1 | 0.8 | 0.6 | 0.4 | 0.2 |
| COOLANT INLET TEMPERATURE | 32 | 1.00 | 0.81 | 0.62 | 0.42 | 0.21 |
| | 29 | 1.05 | 0.85 | 0.65 | 0.44 | 0.23 |
| | 25 | 1.13 | 0.92 | 0.71 | 0.48 | 0.25 |
| | 20 | 1.26 | 1.04 | 0.80 | 0.55 | 0.28 |
| | 15 | 1.47 | 1.22 | 0.96 | 0.67 | 0.35 |
| | 13 | 1.59 | 1.34 | 1.05 | 0.74 | 0.40 |

PERFORMANCE EVALUATION DEVICE FOR VARIABLE-SPEED CENTRIFUGAL CHILLER

BACKGROUND OF THE INVENTION

1. Field of the Invention

The present invention relates to performance evaluation devices for variable-speed centrifugal chillers.

This application is based on Japanese Patent Application No. 2009-265296, the content of which is incorporated herein by reference.

2. Description of Related Art

Variable-speed centrifugal chillers are known turbo chillers that achieve significantly enhanced performance by using variable speed control. Since variable-speed centrifugal chillers have a wide operating range for handling various coolant temperatures and have characteristics that exhibit high energy efficiency in a partial-load range, variable-speed centrifugal chillers are being looked at as an effective solution for saving energy in heat source systems.

In general, the performance of a chiller is evaluated mainly by using a parameter called COP (coefficient of performance). The COP is obtained from the following equation, and a higher COP means that energy efficiency is evaluated as being high.

$$COP = \text{cooling capacity[kW]/power consumption[kW]}$$

In the related art, there is a known method for evaluating a turbo chiller using such COP, for example, the technology disclosed in Japanese Unexamined Patent Application, Publication No. Hei 11-23113. Japanese Unexamined Patent Application, Publication No. Hei 11-23113 discloses a system that detects the chilled liquid inlet temperature, the chilled liquid outlet temperature, and the coolant inlet temperature within a chiller by using temperature sensors and calculates an actual measured value of COP by using the detection data. If the actual measured value of the COP is lower than or equal to a preset threshold value, the system determines that the performance is deteriorated and notifies the user etc. of the deteriorated performance.

In the aforementioned technology of the related art, although COP is used for determining whether or not the performance of the chiller is deteriorated, there is another conceivable method that shows the current operating conditions to the user by sequentially displaying on a display device the aforementioned actual measured value of the COP (referred to as "actual COP" hereinafter), which is sequentially calculated.

However, even if the current actual COP is to be shown to the user, it is not possible for the user to compare the shown current actual COP with a COP (e.g., COP=6.3) corresponding to rated specifications (predetermined temperature and predetermined load) notified by the manufacturer, making it impossible to determine whether the operation efficiency at the current operating point is high or low.

Specifically, a maximum COP (referred to as "planned COP" hereinafter) that can be exhibited by a variable-speed centrifugal chiller in terms of performance varies depending on the operating point of the variable-speed centrifugal chiller. This is because the performance characteristics of the variable-speed centrifugal chiller change depending on the chilled liquid temperature, the coolant temperature, the load factor, and the like, and when operating with a different partial load and a different coolant temperature, the required power changes since the amount of circulating refrigerant and the compression ratio are also different. Therefore, in order to provide a more accurate notification of the current operating conditions of the chiller to the user, it is important to show the user both the planned COP and the actual COP that correspond to the current operating conditions and to allow the user to understand the position of the actual COP relative to the planned COP.

However, sequentially calculating planned COPs in accordance with the operating conditions (chilled liquid temperature, coolant temperature, and load factor) at any given time, for example, is extremely difficult due to the following reasons, and has not been achieved at this point in time.

First, at present, a planned COP of a variable-speed centrifugal chiller is calculated by determining the performance of a heat exchanger included in the variable-speed centrifugal chiller, the performance of a compressor, the thermal properties of a refrigerant, and the like on the basis of an enormous amount of operating data of the chiller respectively, and by introducing performance values of the heat exchanger, the compressor, and the refrigerant to a dedicated program so as to perform many convergent calculations. Therefore, in order to obtain a planned COP for each operating condition, an enormous amount of data is required and the calculation process is extremely complicated, thus requiring a considerable amount of time and effort.

Accordingly, sequential planned-COP calculation performed by sequentially executing a current calculation program that is complicated and time-consuming is not realistic, and it is substantially impossible for a control board of the chiller to perform such sequential planned-COP calculation.

BRIEF SUMMARY OF THE INVENTION

The present invention has been made in view of these circumstances, and an object thereof is to provide a performance evaluation device for a variable-speed centrifugal chiller that can sequentially calculate planned COPs.

In order to solve the aforementioned problems, the present invention provides the following solutions.

The present invention provides a performance evaluation device for a variable-speed centrifugal chiller that includes a data acquisition unit that acquires operating data of the variable-speed centrifugal chiller as input data; a storage unit that stores a first arithmetic equation derived on the basis of mechanical characteristics of the chiller and used for calculating a relative load factor that relatively expresses a relationship between a current load factor at a current coolant inlet temperature and a predetermined load factor at a predetermined coolant inlet temperature set as a reference operating point, a second arithmetic equation that expresses a relationship between the relative load factor and a correction coefficient, and a third arithmetic equation used for calculating a planned COP by using the correction coefficient to correct a COP calculation equation derived from a reverse Carnot cycle; and an arithmetic unit that calculates the planned COP at a current operating point by using the operating data acquired by the data acquisition unit in the first, second, and third arithmetic equations stored in the storage unit, and the correction coefficient obtained in the second arithmetic equation is a correction coefficient for making characteristics of an actual ideal COP under ideal conditions and calculated using the COP calculation equation included in the third arithmetic equation closer to actual COP characteristics.

With this configuration, since the actual ideal COP characteristics under ideal conditions are expressed using the COP calculation equation derived from the reverse Carnot cycle, the actual ideal COP characteristics, which are extremely complicated under ordinary circumstances, can be expressed with a simple arithmetic equation. Moreover, with the incorporation of the correction coefficient for making the actual ideal COP characteristics expressed by the COP calculation equation of the reverse Carnot cycle closer to the actual COP characteristics, for example, characteristics in which the load factor corresponding to a maximum COP varies depending on each coolant inlet temperature can be associated with an arithmetic equation for calculating a planned COP, specifically, the third arithmetic equation. Therefore, the COP characteristics in the variable-speed centrifugal chiller can be sufficiently expressed, and a planned COP at each operating point can be obtained with sufficient accuracy.

Since the arithmetic equation for calculating the planned COP can be expressed with an extremely simple arithmetic equation, a significant advantage of having the ability to perform sequential planned-COP calculation in a control board whose sequential planned-COP calculation and processing capability is not very high can be achieved.

Furthermore, since the aforementioned first to third arithmetic equations are equations that express the COP characteristics basically provided in the variable-speed centrifugal chiller, the equations have high versatility and are relatively independent of the model. Therefore, the equations can be applied to any type of variable-speed centrifugal chillers.

For example, in a known sequential COP acquisition method of the related art, a map whose abscissa indicates the load factor and whose ordinate indicates the COP and that expresses the COP characteristics at each coolant inlet temperature is prepared, and planned COPs are sequentially acquired by using this map. However, even with this method, the map itself needs to be made by preliminarily processing an enormous amount of data for individual devices, meaning that the method requires large processing load and is time consuming. In contrast, since highly versatile arithmetic equations are used in the performance evaluation device for a variable-speed centrifugal chiller according to the present invention, the need for performing processes of adjusting complicated multipliers for individual devices can be eliminated, or in other words, arithmetic equations suitable for individual devices can be created by simply adjusting extremely simple multipliers.

In the aforementioned performance evaluation device for a variable-speed centrifugal chiller, the first arithmetic equation is, for example, an arithmetic equation for deriving the relative load factor from a relative-design airflow coefficient determined by a compressor adiabatic head value.

Since the relative load factor is derived from the relative-design airflow coefficient determined by the compressor adiabatic head value in this manner, the relative load factor can be readily obtained.

In the aforementioned performance evaluation device for a variable-speed centrifugal chiller, the third arithmetic equation preferably includes a term for compensating for heat loss occurring during heat exchange in the variable-speed centrifugal chiller.

Since the heat loss occurring during heat exchange in the variable-speed centrifugal chiller is compensated for, the calculation accuracy of the planned COP can be enhanced.

In the aforementioned performance evaluation device for a variable-speed centrifugal chiller, when the variable-speed centrifugal chiller is operated at a design point of rated specifications different from a design point of rated specifications assumed for the first arithmetic equation, the second arithmetic equation, and the third arithmetic equation, an offset term for compensating for an error with respect to the design point of rated specifications assumed for the first arithmetic equation, the second arithmetic equation, and the third arithmetic equation may be incorporated into the first arithmetic equation.

By incorporating the offset term into the first arithmetic equation in this manner, an error due to a design point of rated specifications can be eliminated, thereby giving higher versatility to the arithmetic equation for obtaining the planned COP.

The aforementioned performance evaluation device for a variable-speed centrifugal chiller may further include a display section that displays the planned COP calculated by the arithmetic unit together with a current actual COP.

Since the display section is provided in this manner, the planned COP and the actual COP calculated by the arithmetic unit can both be provided to the user.

Furthermore, the aforementioned performance evaluation device for a variable-speed centrifugal chiller may be mounted on a control board of the variable-speed centrifugal chiller.

For example, if the planned COP is to be calculated in a device installed at a different location distant from the variable-speed centrifugal chiller, operating data obtained in the variable-speed centrifugal chiller must be sent to the device in real time via a communication medium or the like. On the other hand, the control board of the variable-speed centrifugal chiller constantly receives operating data for controlling the variable-speed centrifugal chiller; therefore, by equipping the control board with a planned-COP calculating function, the planned-COP calculation can also be performed by using the operating data used for the control. Consequently, the troublesome data communication mentioned above becomes unnecessary.

The present invention achieves the advantage of having the ability to sequentially calculate planned COPs.

BRIEF DESCRIPTION OF THE SEVERAL VIEWS OF THE DRAWINGS

FIG. 5 is a diagram illustrating each of load factors when using a common load factor with each of coolant inlet temperatures;

FIG. 9 is a diagram illustrating relative load factor values at each of coolant inlet temperatures when a load factor of 100% at a coolant inlet temperature of 32° C. (coolant outlet temperature of 37° C.) is set as a reference operating point;

DETAILED DESCRIPTION OF THE INVENTION

A performance evaluation device for a variable-speed centrifugal chiller according to an embodiment of the present invention will be described below with reference to the drawings.

Figure 1:
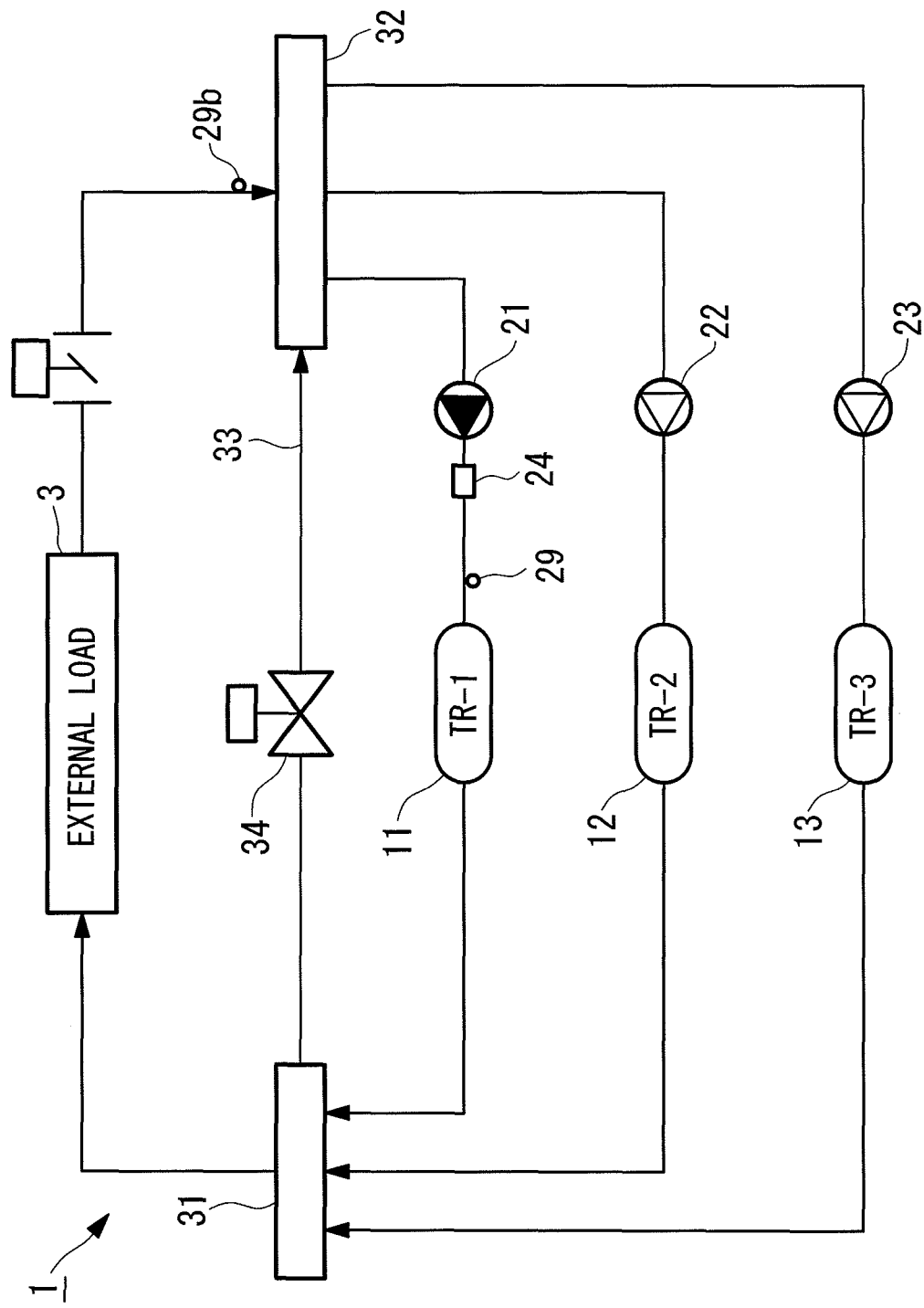
FIG. 1 is a diagram illustrating a general configuration of a heat source system according to an embodiment of the present invention.

First, a variable-speed centrifugal chiller to which the performance evaluation device for a variable-speed centrifugal chiller is applied will be briefly described with reference to FIGS. 1 and 2. FIG. 1 illustrates a general configuration of a heat source system according to an embodiment of the present invention. A heat source system 1 is installed in, for example, a building or plant facilities and includes three variable-speed centrifugal chillers 11, 12 and 13 that apply cooling energy to a chilled liquid (heating medium) to be supplied to an external load 3, such as an air conditioner or a fan coil. These variable-speed centrifugal chillers 11, 12 and 13 are arranged in parallel relative to the external load 3.

Chilled liquid pumps 21, 22, and 23 for pumping the chilled liquid are disposed on the upstream side of the variable-speed centrifugal chillers 11, 12, and 13, respectively, as viewed in the flowing direction of the chilled liquid. These chilled liquid pumps 21, 22, and 23 transfer the chilled liquid from a return header 32 to the respective variable-speed centrifugal chillers 11, 12 and 13. Each of the chilled liquid pumps 21, 22, and 23 is driven by an inverter motor whose rotation speed is variable so as to allow for variable flow-rate control.

A supply header 31 is configured to collect the chilled liquid obtained at each of the variable-speed centrifugal chillers 11, 12 and 13. The chilled liquid collected by the supply header 31 is supplied to the external load 3. After undergoing a temperature increase as a result of being supplied for air conditioning, etc. at the external load 3, the chilled liquid is sent to the return header 32. The chilled liquid is divided at the return header 32 and is distributed to each of the variable-speed centrifugal chillers 11, 12 and 13.

A chilled liquid flowmeter 24 that measures the flow rate from the chilled liquid pump 21 is provided on the downstream side of the chilled liquid pump 21. An output from this chilled liquid flowmeter 24 is sent to a control board 74 (see FIG. 2), to be described below, of the variable-speed centrifugal chiller 11.

A chilled liquid pipe on the upstream side of the variable-speed centrifugal chiller 11 is provided with a chilled liquid inlet temperature sensor 29 for measuring the temperature of chilled liquid flowing into the variable-speed centrifugal chiller 11. An output from this chilled liquid inlet temperature sensor 29 is sent to the control board 74 (see FIG. 2), to be described below. Alternatively, if a bypass valve 34 of a bypass pipe 33 is completely closed, a temperature sensor 29b provided in a chilled liquid pipe on the upstream side of the return header 32 may be used in place of the chilled liquid inlet temperature sensor.

Similar to the variable-speed centrifugal chiller 11, the variable-speed centrifugal chillers 12 and 13 are each provided with a chilled liquid flowmeter and a chilled liquid inlet temperature sensor. However, FIG. 1 illustrates the configurations of the chilled liquid flowmeter and the chilled liquid inlet temperature sensor only for the variable-speed centrifugal chiller 11 for ease of understanding.

Figure 2:
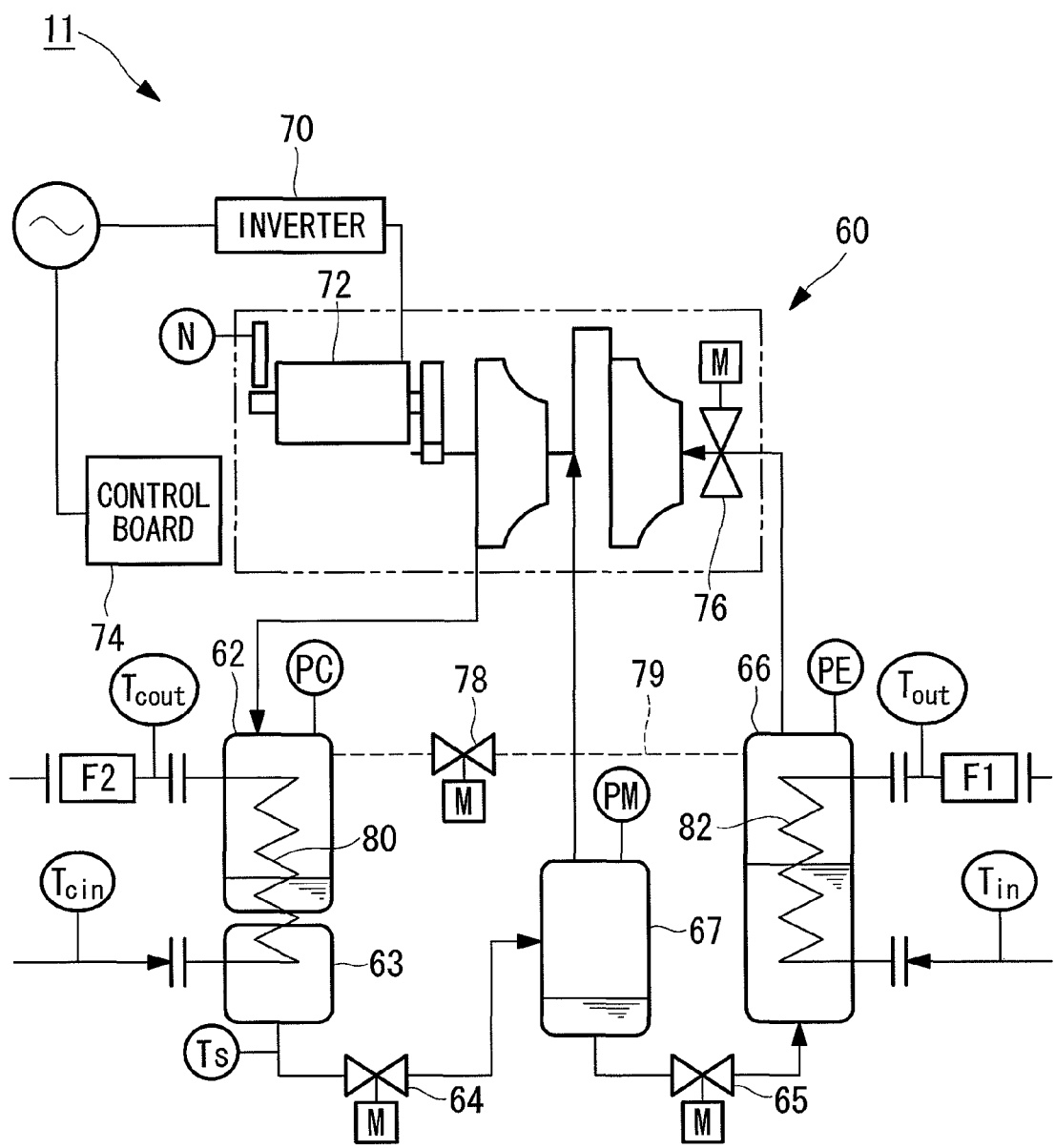
FIG. 2 is a diagram illustrating a detailed configuration of a variable-speed centrifugal chiller according to an embodiment of the present invention.

FIG. 2 illustrates a detailed configuration of the variable-speed centrifugal chillers 11, 12 and 13. In this drawing, only the variable-speed centrifugal chiller 11 of the three parallel-arranged variable-speed centrifugal chillers is shown for ease of understanding.

The variable-speed centrifugal chiller 11 is configured to achieve a two-stage compression, two-stage expansion sub-cooling cycle. The variable-speed centrifugal chiller 11 includes a turbo compressor 60 that compresses a refrigerant, a condenser 62 that condenses the high-temperature high-pressure gaseous refrigerant compressed by the turbo compressor 60, a sub-cooler 63 that supercools the liquid refrigerant condensed by the condenser 62, a high-pressure expansion valve 64 that expands the liquid refrigerant from the sub-cooler 63, an intercooler 67 connected to the high-pressure expansion valve 64 and to an intermediate stage of the turbo compressor 60 and a low-pressure expansion valve 65, and an evaporator 66 that evaporates the liquid refrigerant expanded by the low-pressure expansion valve 65.

The turbo compressor 60 is a centrifugal two-stage compressor and is driven by an electric motor 72 whose rotation speed is controlled by an inverter 70. An output from the inverter 70 is controlled by the control board 74. A refrigerant intake port of the turbo compressor 60 is provided with an inlet guide vane (referred to as "IGV" hereinafter) 76 that controls the flow rate of refrigerant to be taken in so as to allow for capacity control of the variable-speed centrifugal chiller 11.

The condenser 62 is provided with a condensed-refrigerant pressure sensor Pc for measuring the condensed-refrigerant pressure. An output from the sensor Pc is sent to the control board 74.

The sub-cooler 63 is provided on the downstream side of the condenser 62, as viewed in the flowing direction of the refrigerant, so as to supercool the condensed refrigerant. A temperature sensor Ts that measures the temperature of the supercooled refrigerant is provided immediately downstream of the sub-cooler 63, as viewed in the flowing direction of the refrigerant.

A cooling heat-transfer surface 80 for cooling the condenser 62 and the sub-cooler 63 is disposed therein. A flowmeter F2 measures the coolant flow rate, a temperature sensor Tcout measures the coolant outlet temperature, and a temperature sensor Tcin measures the coolant inlet temperature. A coolant is made to release heat to the outside at a cooling tower (not shown) and is subsequently introduced back into the condenser 62 and the sub-cooler 63.

The intercooler 67 is provided with a pressure sensor PM for measuring the intermediate pressure.

The evaporator 66 is provided with a pressure sensor PE for measuring the evaporation pressure. Heat absorption is performed in the evaporator 66 so that chilled liquid with a rated temperature (of, for example, 7° C.) is obtained. A chilled liquid heat-transfer surface 82 is disposed in the evaporator 66 for cooling the chilled liquid to be supplied to the external load 3. A flowmeter F1 measures the chilled liquid flow rate, a temperature sensor Tout measures the chilled liquid outlet temperature, and a temperature sensor Tin measures the chilled liquid inlet temperature.

A hot-gas bypass pipe 79 is provided between a gas-phase section of the condenser 62 and a gas-phase section of the evaporator 66. Furthermore, a hot-gas bypass valve 78 for controlling the flow rate of refrigerant flowing through the hot-gas bypass pipe 79 is provided. By adjusting the hot-gas bypass flow rate using the hot-gas bypass valve 78, capacity control of an extremely small range that is not sufficiently controlled using only the IGV 76 is possible.

In the above description of the variable-speed centrifugal chiller 11 shown in FIG. 2, the condenser 62 and the sub-cooler 63 are provided so as to heat the coolant by performing heat exchange between the refrigerant and the coolant that is made to release heat to the outside at the cooling tower. Furthermore, for example, an air-heat exchanger may be disposed in place of the condenser 62 and the sub-cooler 63 so as to perform heat exchange between the outside air and the refrigerant in the air-heat exchanger. The variable-speed centrifugal chillers 11, 12 and 13 are not limited to the above-described type having only a cooling function, and may be, for example, a type having only a heating function or a type having both cooling and heating functions. Moreover, a medium that is used to exchange heat with the refrigerant may be water or air.

Next, a planned-COP calculation method performed in the control board 74 included in the aforementioned variable-speed centrifugal chiller 11 will be described with reference to the drawings.

The control board 74 is constituted of, for example, a central processing unit (CPU) (not shown), a random access memory (RAM), a computer-readable recording medium and the like. A series of processes for achieving various functions, to be described below, is recorded in the recording medium or the like in a program format; the CPU reads the program for the RAM or the like and performs information processing and calculation so as to achieve the various functions, to be described below.

Figure 3:
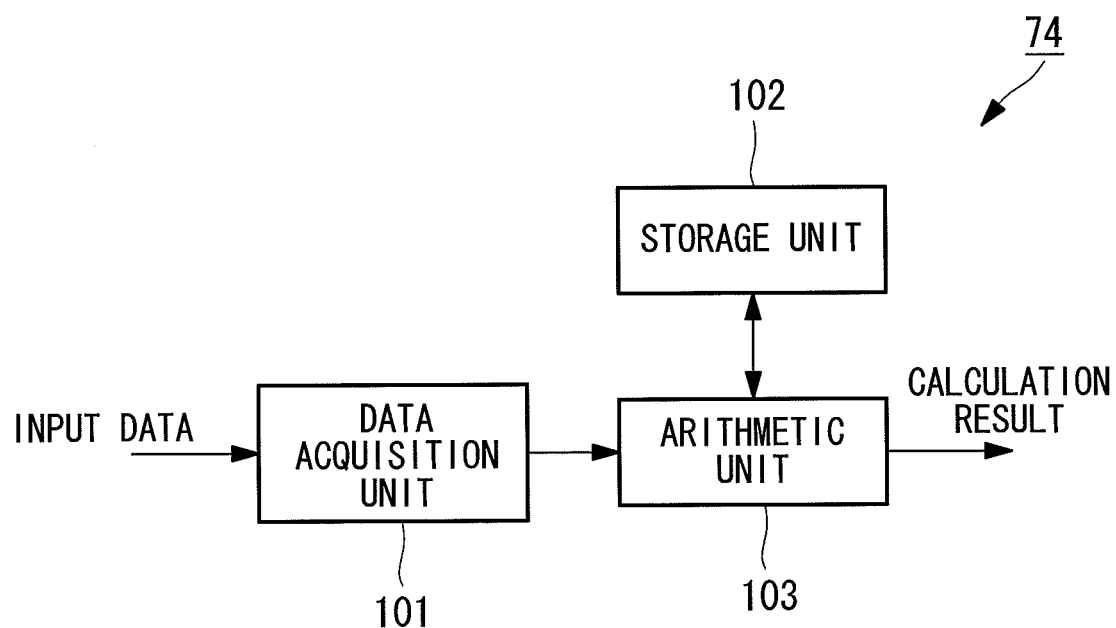
FIG. 3 is a functional block diagram illustrating, in expanded form, functions included in a control board shown in FIG. 2.

FIG. 3 is a functional block diagram showing, in expanded form, the functions included in the control board 74. As shown in FIG. 3, the control board 74 includes a data acquisition unit 101, a storage unit 102, and an arithmetic unit 103.

The data acquisition unit 101 acquires operating data of the variable-speed centrifugal chiller 11 as input data. Examples of operating data include the coolant outlet temperature measured by the temperature sensor Tcout, the coolant inlet temperature measured by the temperature sensor Tcin, the chilled liquid outlet temperature measured by the temperature sensor Tout, the chilled liquid inlet temperature measured by the temperature sensor Tin, and a current load factor.

The storage unit 102 stores a first arithmetic equation, a second arithmetic equation, a third arithmetic equation and the like for calculating a planned COP. The term "planned COP" refers to a maximum COP value that can be exhibited by the variable-speed centrifugal chiller in terms of performance at each operating point.

Before describing each of the arithmetic equations, a process of how an arithmetic equation for calculating a COP is derived will be described in detail below.

First, a COP calculated under ideal conditions that are no mechanical loss or the like (this COP will be referred to as "actual ideal COP" hereinafter) in the same refrigeration cycle as the actual device will be considered. With regard to this actual ideal COP, under conditions of constant chilled liquid outlet temperature, the COP characteristics change in accordance with the coolant outlet temperature, whereas a change in the COP characteristics caused by the load factor is very small. Therefore, it can be considered that the actual ideal COP has a feature that is dependent on the coolant outlet temperature but not on the load factor.

The present inventors focus on the point that the characteristics of the actual ideal COP having the above-mentioned feature are substantially the same as COP characteristics in a reverse Carnot cycle. After performing a verification test, the COP characteristics were close to the actual ideal COP characteristics as the reproducibility exceeded about 90%.

First, an arithmetic equation of the COP characteristics in the reverse Carnot cycle is used as a substitute for an arithmetic equation that expresses the actual ideal COP. Thus, the actual ideal COP can be expressed with an extremely simple arithmetic equation. The COP in the reverse Carnot cycle is expressed by, for example, the following equation (1).

$$\text{COP}_{carnot} = (T_{LO} + 273.15)/(T_{HO} - T_{LO}) \quad (1)$$

In the above equation (1), $T_{LO}$ denotes the chilled liquid outlet temperature, and $T_{HO}$ denotes the coolant outlet temperature.

As mentioned above, the actual ideal COP is a COP obtained under ideal conditions that are no mechanical loss or the like; therefore, in order to obtain COP characteristics of the actual device (referred to as "actual COP" hereinafter), which receives loss due to control or the like, from the aforementioned arithmetic equation, it is necessary to ascertain the difference between the actual ideal COP characteristics and the actual COP characteristics and add a correction term that accords with this difference to the aforementioned equation (1). Therefore, a correction term to be added to the aforementioned equation (1) will be discussed below.

Figure 4:
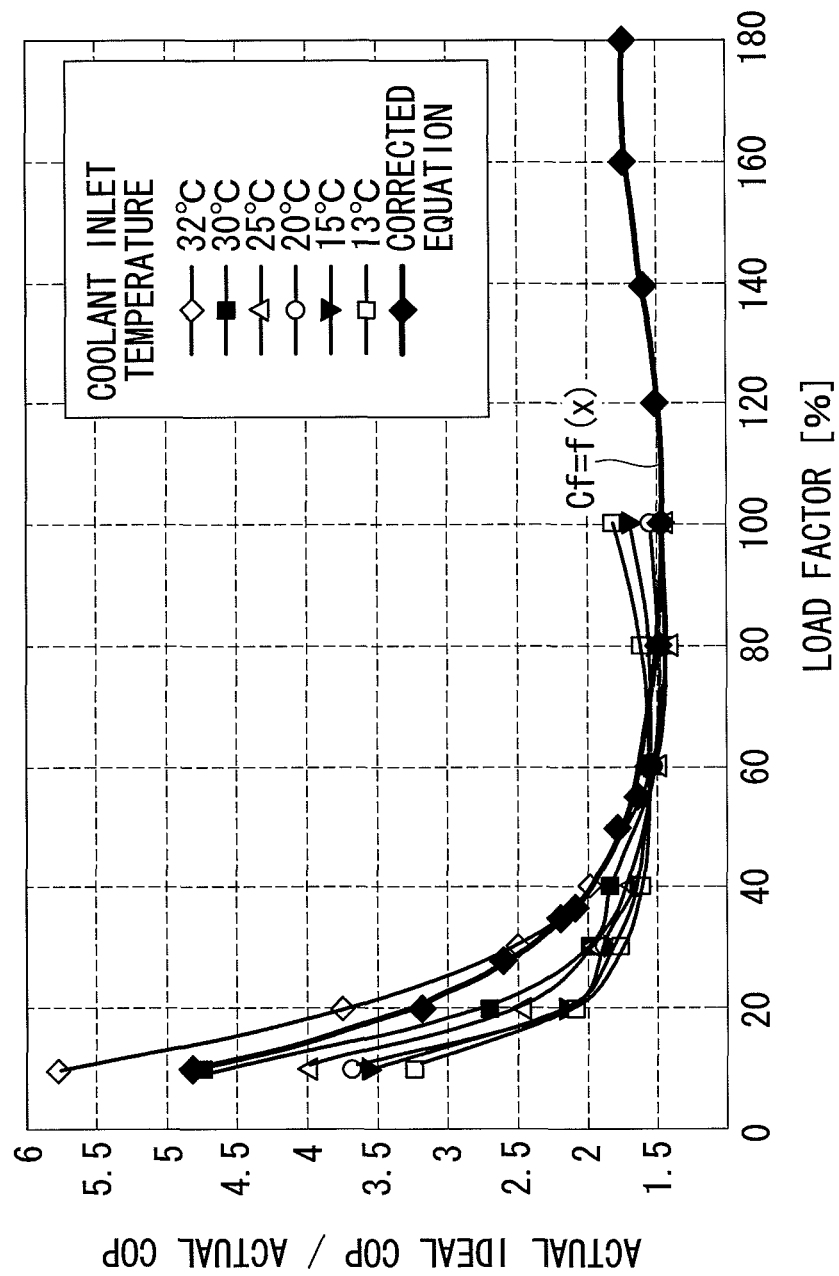
FIG. 4 is a COP characteristic diagram illustrating a comparison between actual ideal COP characteristics and actual COP characteristics.

First, in order to ascertain the difference between the actual ideal COP characteristics and the actual COP characteristics, as a practical matter, the present inventors have created a graph, as shown in FIG. 4, by acquiring actual operating data corresponding to each coolant inlet temperature and load factor in the actual device, calculating the actual COP on the basis of the operating data, and using this actual COP.

In FIG. 4, the abscissa indicates the load factor [%], and the ordinate indicates a value obtained by dividing the actual ideal COP by the actual COP. The actual ideal COP shown here is the COP calculated under ideal conditions that are no mechanical loss or the like, as well as in the same refrigeration cycle and refrigerant properties as in the actual device, and is obtained using a predetermined program.

As shown in FIG. 4, although the characteristics more or less differ from each other depending on each coolant inlet temperature, the characteristics have similar features. If the characteristics dependent on these coolant inlet temperatures can be expressed with a single equation, a common correction term can be used among all of the coolant inlet temperatures. Using a common correction term in this manner eliminates the need to prepare correction terms that differ among the coolant inlet temperatures and can thus further simplify the arithmetic equation.

Therefore, a correction term is obtained by approximating a plurality of characteristic curves corresponding to each of coolant inlet temperatures by a single function equation, and the aforementioned equation (1) is corrected on the basis of this correction term.

The following equation (2) is a COP calculation equation having the correction term, and the following equation (3) is the correction term.

$$\text{COP}_{cf} = \{(T_{LO} + 273.15)/(T_{HO} - T_{LO})\}/Cf \quad (2)$$

$$Cf = f(x) \quad (3)$$

The next problem is which kind of parameter is to be introduced as x in the aforementioned equation (3). Regarding x in the aforementioned equation (3), a correction coefficient Cf is obtained by using a common load factor Qf at each of the coolant inlet temperatures, as shown in FIG. 5, and the COP is calculated by using this correction coefficient Cf in equation (2). The COP calculated on the basis of equation (2) will be referred to as "calculated COP".

Figure 6:
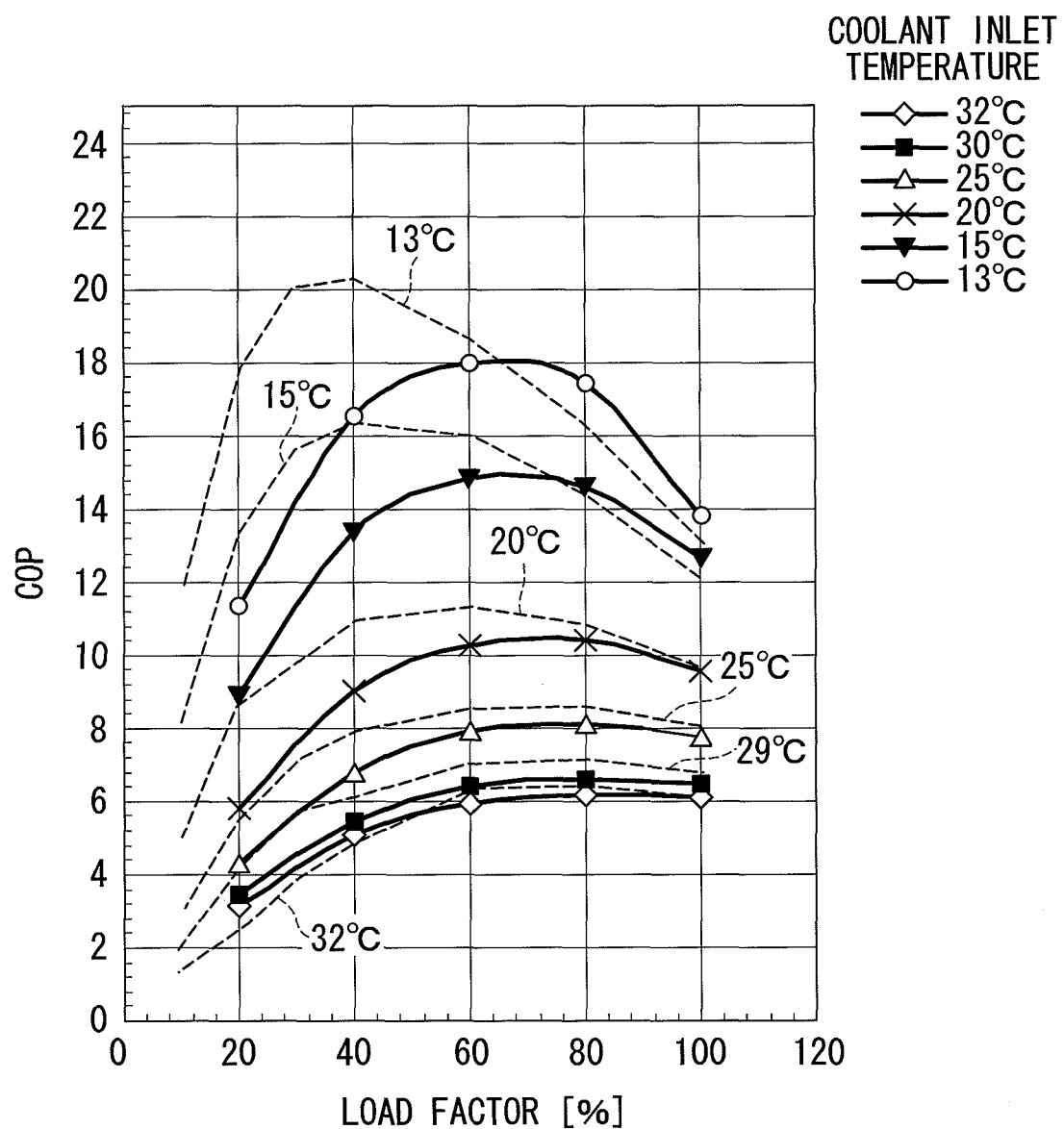
FIG. 6 is a diagram illustrating a comparison between calculated COP characteristics and actual COP characteristics in the case where a COP is calculated using a correction coefficient when a load factor shown in FIG. 5 is used as a parameter.

Furthermore, a verification test when using the load factor Qf as the parameter x in the aforementioned equation (3) was performed by comparing the calculated COP and the actual COP. FIG. 6 illustrates the test results, in which the abscissa indicates the load factor and the ordinate indicates the COP. Moreover, in FIG. 6, a solid line denotes the calculated COP and a dotted line denotes the actual COP. As shown in FIG. 6, there is a significant amount of error occurring between the calculated COP and the actual COP at each coolant inlet temperature; therefore, it is apparent that, the common load factor Qf at each of the coolant inlet temperatures cannot be used as x in the aforementioned equation (3).

The following is an example of a conceivable reason why the results shown in FIG. 6 are obtained.

Figure 7:
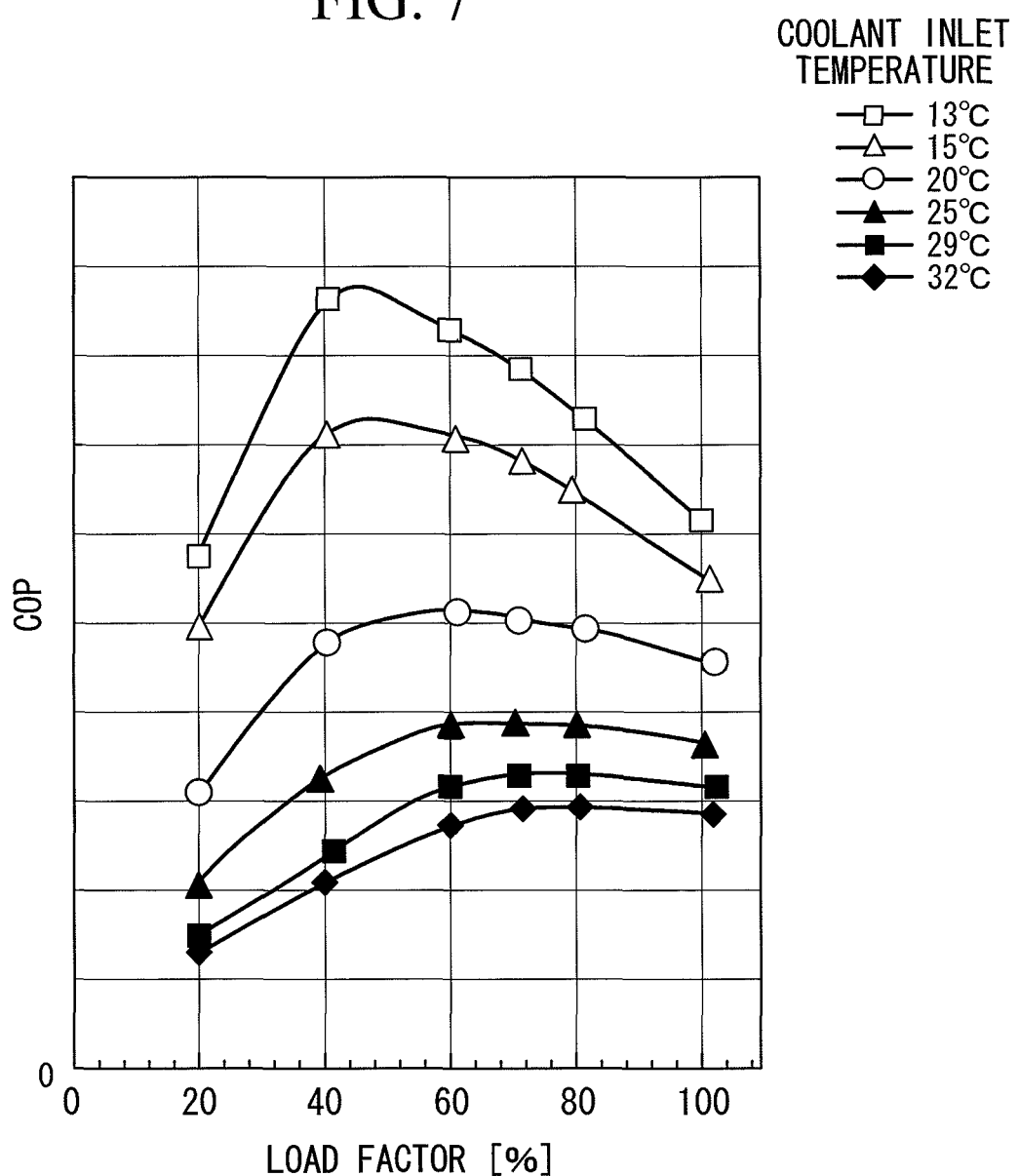
FIG. 7 is a diagram illustrating the relationship between a COP and a load factor for each coolant inlet temperature in the variable-speed centrifugal chiller.

Specifically, as shown in FIG. 7, depending on each coolant inlet temperature, the actual COP characteristics generally have a different load factor corresponding to the maximum COP at the same coolant inlet temperature. For example, when the coolant inlet temperature is 13° C., the COP has a peak value near a load factor of 40%, or when the coolant inlet temperature is 25° C., the COP has a peak value near a load factor of 60%. In this manner, the load factor that gives a peak in the COP shifts to the lower side as the coolant inlet temperature decreases. Therefore, if a common load factor Qf is used as a correction term at each of the coolant inlet temperatures, as mentioned above, it becomes impossible to incorporate the effect that the load factor has on the COP characteristics, as shown in FIG. 7, into the arithmetic equation, conceivably resulting in a significant amount of error occurring between the calculated COP and the actual COP, as shown in FIG. 6.

Based on this, as x in the aforementioned equation (3), it is apparently necessary to obtain a correction efficient Cf by using a parameter that is obtained in view of the characteristics in which a load factor corresponding to the maximum COP at the same coolant inlet temperature varies depending on each coolant inlet temperature.

Consequently, as an idea for associating with the characteristics in which the maximum COP varies depending on each coolant inlet temperature, a point of an arbitrary load factor at an arbitrary coolant inlet temperature is set as a reference operating point, and a relative load factor that relatively expresses the load factor at each coolant inlet temperature with respect to this reference operating point is obtained, so as to use this relative load factor as the parameter x in the aforementioned equation (3).

Figure 8:
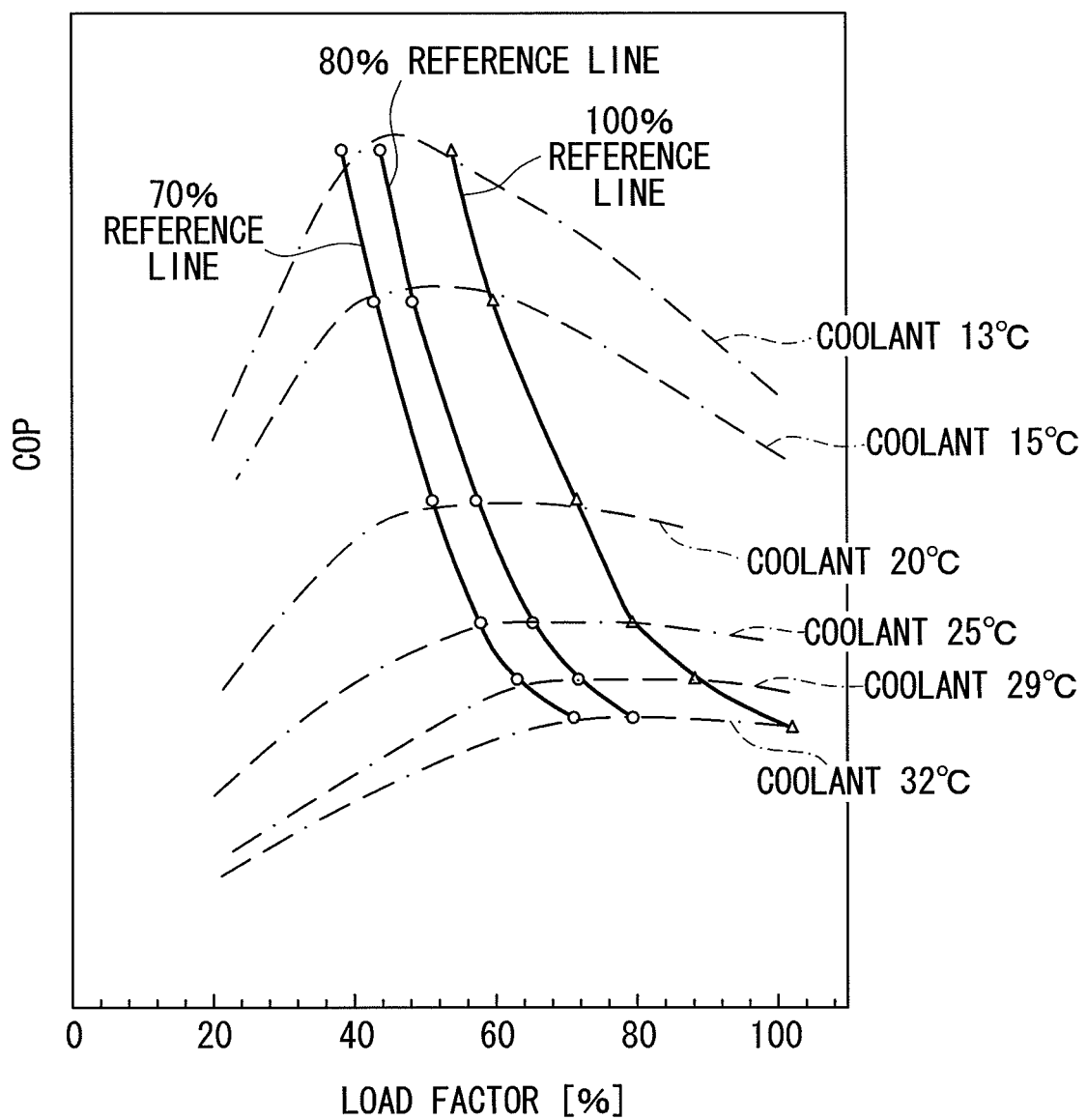
FIG. 8 is a diagram for explaining a relative load factor.

For example, as shown in FIG. 8, when a point of a load factor of 100% at a coolant inlet temperature of 32° C. is set as a reference operating point, the load factor corresponding to the 100% load factor when the coolant inlet temperature is 32° C. decreases with decreasing coolant inlet temperature. A graph in FIG. 8 shows characteristics obtained from mechanical characteristics of a turbo compressor (centrifugal compressor) used in a variable-speed centrifugal chiller.

For example, as also disclosed in Japanese Unexamined Patent Application, Publication No. 2009-204262, the COP characteristics of a variable-speed centrifugal chiller are known to strongly reflect the characteristics of a turbo compressor. It was discovered that the relative load factor can be readily determined by using the characteristics of the turbo compressor. A method of calculating a relative load factor will be described below.

First, a relative load factor $Qf_r$ can be calculated by using a relative design airflow coefficient $Q_r$, which is a mechanical characteristic of the turbo compressor, on the basis of the following equation (4).

$$Qf_r = Qf/Q_r \quad (4)$$

In the aforementioned equation (4), Qf denotes the actual load factor.

The relative design airflow coefficient $Q_r$ can be obtained from the mechanical characteristics of the turbo compressor on the basis of the following equation (5).

$$H_{ad}/\mu_{ad} = k(Q_r/\Phi)^2 \quad (5)$$

In the aforementioned equation (5), $H_{ad}$ denotes a compressor adiabatic head [m], $\Phi$ denotes a flow-rate coefficient [-], and $\mu_{ad}$ denotes a pressure coefficient [-], and the flow-rate coefficient $\Phi$ and the pressure coefficient $\mu_{ad}$ are given as fixed values. For example, the flow-rate coefficient $\Phi=0.1$, and the pressure coefficient $\mu_{ad}=1$.

Supposing that a load factor of 100% at a coolant inlet temperature of 32° C. (coolant outlet temperature of 37° C.) is set as the reference operating point of the turbo compressor, a compressor adiabatic head $H_{ad}$ and a relative design airflow coefficient $Q_r$ corresponding to this reference operating point are obtained from the mechanical characteristics of the turbo compressor, and these values are incorporated into the aforementioned equation (5) so as to calculate a coefficient k at the reference operating point. Then, the value of k is set as $k_{100}$, and $k_{100}$ is used in the aforementioned equation (5) so as to calculate a compressor adiabatic head $H_{ad}$ from each coolant inlet temperature and each chilled liquid outlet temperature. The calculated compressor adiabatic head $H_{ad}$ is substituted into the aforementioned equation (5). In consequence, a relative design airflow coefficient $Q_r$ at each coolant inlet temperature is calculated.

An arithmetic equation for the relative design airflow coefficient $Q_r$ after $k_{100}$ is obtained is expressed by the following equation (6) obtained from the aforementioned equation (5) when the flow-rate coefficient $\Phi=0.1$ and the pressure coefficient $\mu_{ad}=1$, as mentioned above.

$$Q_r = \Phi/\mu_{ad}^{1/2} \cdot (H_{ad}/k_{100})^{1/2} = 0.1*(H_{ad}/19.4)^{1/2} \quad (6)$$

By substituting the relative design airflow coefficient $Q_r$ at each coolant inlet temperature calculated from the aforementioned equation (6) into the aforementioned equation (4), the relative load factor $Qf_r$ when the load factor of 100% at the coolant inlet temperature of 32° C. is set as a reference is obtained for each coolant inlet temperature and for each load factor.

FIG. 9 illustrates relative load factor $Qf_r$ values obtained by the above-described method. As shown in FIG. 9, it is apparent that the point of 100% relative load factor shifts toward the lower load-factor side as the coolant inlet temperature decreases.

Figure 10:
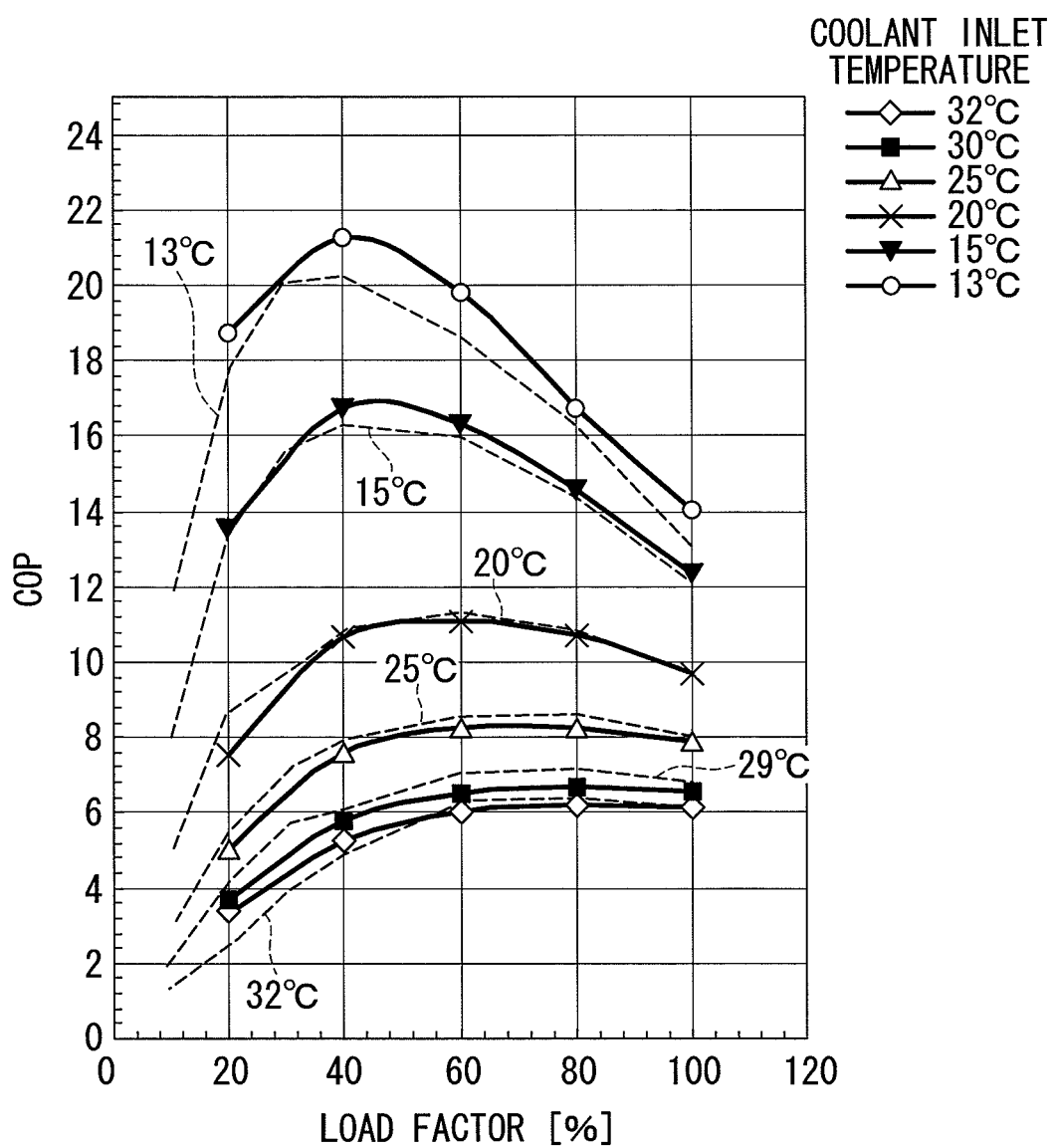
FIG. 10 is a diagram illustrating a comparison between actual COP characteristics and calculated COP characteristics in the case where a COP is calculated using a correction coefficient when a relative load factor shown in FIG. 9 is used as a parameter.

FIG. 10 is a diagram illustrating a comparison between the actual COP and the calculated COP calculated from equation (2) by using the correction coefficient Cf obtained using $Qf_r$ obtained in the above-described manner as a parameter x in the aforementioned equation (3). In FIG. 10, a solid line denotes the calculated COP and a dotted line denotes the actual COP. As shown in FIG. 10, the calculated COP and the actual COP at each coolant inlet temperature have substantially the same characteristic, and reproducibility is thus confirmed.

Based on the above description, it was discovered that a planned COP at each operating point can be obtained with sufficient accuracy by using an arithmetic equation obtained by dividing an arithmetic equation for the COP in the reverse Carnot cycle considered as the actual ideal COP characteristics by a correction coefficient that uses the relative load factor $Qf_r$ as a parameter.

For sequentially calculating planned COPs during operation of the actual variable-speed centrifugal chiller, the various arithmetic equations mentioned above are stored in the storage unit 102 shown in FIG. 3.

For example, the storage unit 102 mainly stores the following arithmetic equations.

First Arithmetic Equations:

$$Q_r = \Phi/\mu_{ad}^{1/2} \cdot (H_{ad}/k_{100})^{1/2} = 0.1 * (H_{ad}/19.4)^{1/2} \quad (6)$$

$$Qf_r = Qf/Q_r \quad (4)$$

Second Arithmetic Equation:

$$Cf = Ff(Qf_r) \quad (3)$$

Third Arithmetic Equation:

$$COP_{cr} = \{(T_{LO} + 273.15)/(T_{HO} - T_{LO})\}/Cf \quad (2)$$

The first arithmetic equations are derived on the basis of the mechanical characteristics of the turbo compressor in the variable-speed centrifugal chiller, as mentioned above, and are used for calculating a relative load factor $Qf_r$ that expresses, as a relative value, the relationship between the current load factor at the current coolant inlet temperature and the predetermined load factor at the predetermined coolant inlet temperature set as a reference operating point.

Furthermore, $H_{ad}$ in equation (6) is obtained using the following equation (7) based on thermodynamic characteristics.

$$H_{ad} = (-2.7254*10^{-4}T_{LO}^2 - 9.0244*10^{-3}T_{LO} + 47.941) * \{\log_{10}P_c - \log_{10}P_e\} * 1000/9.8067 \quad (7)$$

In the aforementioned equation (7), $P_c$ denotes the saturation pressure [MPa] of the condenser, $P_e$ denotes the saturation pressure [MPa] of the evaporator.

$T_{LO}$ in equation (2), which is the third arithmetic equation, denotes the chilled liquid outlet temperature [° C.] and $T_{HO}$ denotes the coolant outlet temperature [° C.], into which operating data items acquired by the data acquisition unit 101 are respectively substituted.

In addition to the first arithmetic equations, the second arithmetic equation, and the third arithmetic equation used mainly for calculating the planned COP, as mentioned above, the storage unit 102 also stores subsidiary arithmetic equations for calculating various parameters used in the aforementioned arithmetic equations.

When input data is acquired by the data acquisition unit 101, the arithmetic unit 103 reads the various arithmetic equations from the storage unit 102 and calculates the planned COP at the current operating point by using these arithmetic equations. In detail, the arithmetic unit 103 obtains the relative load factor $Qf_r$ at the current operating point by using the first arithmetic equations and then obtains the correction coefficient $Cf$ by substituting this relative load factor $Qf_r$ into the second arithmetic equation. Subsequently, the planned COP is obtained by substituting this correction coefficient $Cf$ into the third arithmetic equation.

Although detail descriptions will be omitted here, the control board 74 calculates an output heat amount, the actual COP (i.e., a value obtained by dividing the output heat amount [kW] by the power consumption [kW]) at the current operating point, and the like concurrently with the planned-COP calculation.

The planned COP, the actual COP, the output heat amount, the measured power consumption, and the like calculated in the control board 74 are sent to a monitoring device (not shown) via a communication medium so as to be displayed on a monitor provided in the monitoring device. In consequence, the user can check these performance values displayed on the monitor of the monitoring device so as to ascertain the actual COP relative to the planned COP, thereby allowing for more efficient operation.

As described above, with the performance evaluation device for a variable-speed centrifugal chiller according to this embodiment, since the actual ideal COP is expressed with a COP calculation equation in the reverse Carnot cycle, the actual ideal COP characteristics can be expressed with a simple arithmetic equation. Moreover, since a correction term that uses the relative load factor $Qf_r$ as a parameter is incorporated into this COP calculation equation in the reverse Carnot cycle, the actual COP characteristics dependent on the coolant inlet temperature and the load factor can be sufficiently incorporated in the aforementioned COP calculation equation in the reverse Carnot cycle, whereby the planned COP at each operating point can be obtained with sufficient accuracy.

Since the arithmetic equation for calculating the planned COP can be expressed with a simple arithmetic equation, sequential planned-COP calculation can be performed in a control board whose sequential planned-COP calculation and processing capability is not very high.

In consequence, the performance evaluation device for a variable-speed centrifugal chiller according to this embodiment can achieve a significant advantage of calculating the planned COP in real time and with sufficient accuracy.

In the above embodiment, the display mode for the monitor of the monitoring device is not particularly limited. For example, the planned COP and the actual COP may be directly displayed, or a value obtained by dividing the actual COP by the planned COP may be displayed. Alternatively, the actual COP at the current operating point may be displayed by being plotted on a graph showing a load-factor-versus-planned-COP characteristic at each coolant inlet temperature, as shown in FIG. 7, obtained using the aforementioned arithmetic equations.

If a variable-speed centrifugal chiller is made to operate at a design point different from that of the variable-speed centrifugal chiller used for creating a Cf calculation equation created in the above embodiment, for example, a design point corresponding to a different chilled liquid temperature or coolant temperature, a pressure variable and a flow-rate variable in the variable-speed centrifugal chiller would be different.

For example, supposing that the aforementioned Cf calculation equation is created with a chilled liquid outlet temperature of 7° C. and a coolant inlet temperature of 32° C. as a design point of rated specifications, if the planned COP is to be calculated by directly applying the aforementioned arithmetic equations to a variable-speed centrifugal chiller made to operate at a chilled liquid outlet temperature of 5° C. and a coolant inlet temperature of 32° C. as a design point of rated specifications, an error occurs due to the difference in the design point of rated specifications.

In light of this, in order to reflect the error occurring due to the difference in the design point of rated specifications to the aforementioned Cf calculation equation (more specifically, a calculation equation for the relative load factor $Qf_r$ used in the Cf calculation equation), an offset term may be added to the relative-load-factor arithmetic equation obtained in the aforementioned equation (4).

The offset term will be described below.

Figure 11:
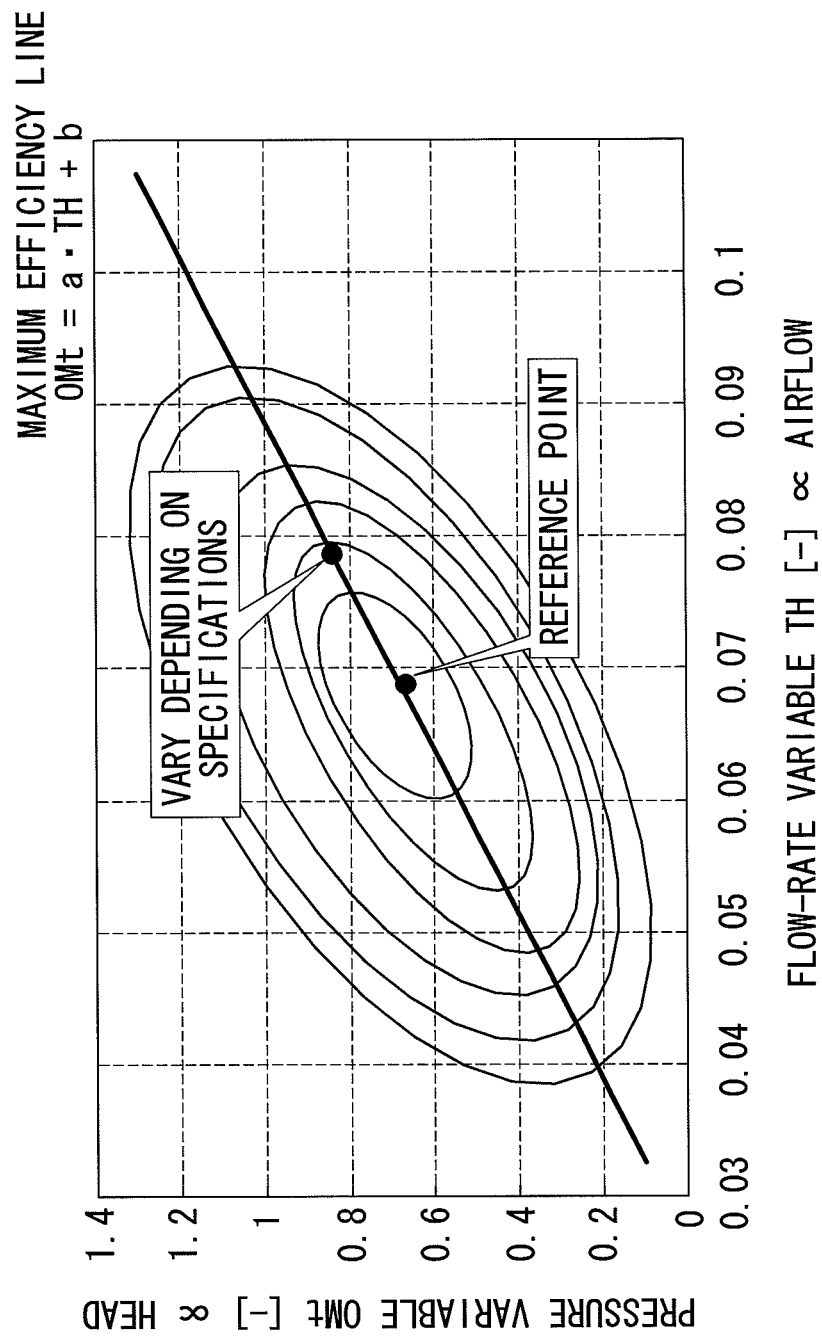
FIG. 11 is a diagram for explaining an offset term.

As shown in FIG. 11, the abscissa indicates a flow-rate variable and the ordinate indicates a pressure variable, and a characteristic equation of the flow-rate variable and the pressure variable, as shown in the following equation (8), is obtained by connecting dots where the adiabatic efficiency is maximum at each pressure variable in a map illustrating the distribution of adiabatic efficiency in the turbo compressor used in the variable-speed centrifugal chiller. In this case, the flow-rate variable is proportional to the airflow in the turbo compressor, and the pressure variable is proportional to the head.

$$OM_t = a*TH + b \quad (8)$$

In the aforementioned equation (8), $OM_t$ denotes a pressure variable [−], TH denotes a flow-rate variable [−], and a and b denote constants. Subsequently, from equation (8), a flow-rate variable $TH_{rp}$ on a maximum efficiency line and with the same pressure variable as the design point of rated specifications during actual operation is obtained. In this case, since the pressure variable is expressed by the following equation (9), $OM_t$ calculated on the basis of equation (9) is used in equation (8).

$$OM_t = g*H_{ad}/A^2 \quad (9)$$

Subsequently, since the flow-rate variable is also expressed by the following equation (10), a flow-rate variable $TH_{rps}$ at the design point of rated specifications when the COP calculation equation is derived is obtained from equation (10).

$$TH_{rps} = \{(Q_{rp}/ql)*v\}(A*D^2) \quad (10)$$

In the aforementioned equations (9) and (10), g denotes gravitational acceleration [m/s²], $H_{ad}$ denotes the compressor adiabatic head [m], A denotes the velocity of sound [m/s], $Q_{rp}$ denotes the rated cooling capacity [kW], ql denotes latent heat of vaporization [kJ/kg], v denotes specific volume [m³/kg], and D denotes the outside diameter [m] of an impeller.

An offset term obtained by dividing the flow-rate variable $TH_{rp}$ by the flow-rate variable $TH_{rps}$ is incorporated into the aforementioned equation (4). In consequence, a relative-load-factor arithmetic equation having the offset term is expressed by the following equation (11).

$$Qf_r = Qf/Q_r * (TH_{rp}/TH_{rps}) \quad (11)$$

By incorporating the offset term into the relative-load-factor arithmetic equation in this manner, an error due to a design point can be eliminated, thereby giving higher versatility to the COP calculation equation included in the control board.

Although the condensation temperature and the evaporation temperature should normally be used in the third arithmetic equation for calculating the planned COP, the above embodiment uses the coolant outlet temperature $T_{HO}$ and the chilled liquid outlet temperature $T_{LO}$ in place of the condensation temperature and the evaporation temperature. Therefore, heat loss occurs during the heat exchange, and the error is included. In order to eliminate such an error caused by the loss occurring during the heat exchange, a loss-relative-temperature difference Td determined by the mechanical characteristics (which vary depending on, for example, the size and the manufacturer) of the evaporator and the condenser may be added to the third arithmetic equation, as shown in the following equation (12). This allows for compensation for the loss occurring during the heat exchange.

$$COP_{ct} = \{(T_{LO} + 273.15)/(T_{HO} - T_{LO} + Td)\}/Cf \quad (12)$$

The Td value may be registered as an initial value by the manufacturer and may be stored in the storage unit 102 when shipping the variable-speed centrifugal chiller.

Although the actual ideal COP should normally be used in the third arithmetic equation for readily calculating the planned COP, the above embodiment uses the COP calculated from the reverse Carnot cycle in place of the actual ideal COP. Even though the reproducibility of the actual ideal COP relative to the COP calculated from the reverse Carnot cycle is 90% or higher, as mentioned above, a value obtained by dividing a rated point of the planned COP by a COP corresponding to a rated point of the chiller in actual operation may be reflected on sequentially-calculated planned COPs calculated in the third arithmetic equation so as to eliminate minute errors. This allows for calculation of the planned COP with even higher accuracy.

What is claimed is:

1. A performance evaluation device for a variable-speed centrifugal chiller, comprising:
    a data acquisition unit that acquires operating data of the variable-speed centrifugal chiller as input data;
    a storage unit that stores a first arithmetic equation derived on the basis of mechanical characteristics of the chiller and used for calculating a relative load factor that relatively expresses a relationship between a current load factor at a current coolant inlet temperature and a predetermined load factor at a predetermined coolant inlet temperature set as a reference operating point, a second arithmetic equation that expresses a relationship between the relative load factor and a correction coefficient, and a third arithmetic equation used for calculating a planned COP by using the correction coefficient to correct a COP calculation equation derived from a reverse Carnot cycle; and
    an arithmetic unit that calculates the planned COP at a current operating point by using the operating data acquired by the data acquisition unit in the first, second, and third arithmetic equations stored in the storage unit,
    wherein the correction coefficient obtained in the second arithmetic equation is a correction coefficient for making characteristics of an actual ideal COP under ideal conditions and calculated using the COP calculation equation included in the third arithmetic equation closer to actual COP characteristics.

2. The performance evaluation device for a variable-speed centrifugal chiller according to claim 1, wherein the first arithmetic equation is an arithmetic equation for deriving the relative load factor from a relative-design airflow coefficient determined by a compressor adiabatic head value.

3. The performance evaluation device for a variable-speed centrifugal chiller according to claim 1, wherein the third arithmetic equation includes a term for compensating for heat loss occurring during heat exchange in the variable-speed centrifugal chiller.

4. The performance evaluation device for a variable-speed centrifugal chiller according to claim 1, wherein when the variable-speed centrifugal chiller is operated at a design point of rated specifications different from a design point of rated specifications assumed for the first arithmetic equation, the second arithmetic equation, and the third arithmetic equation, an offset term for compensating for an error with respect to the design point of rated specifications assumed for the first arithmetic equation, the second arithmetic equation, and the third arithmetic equation is incorporated into the first arithmetic equation.

5. The performance evaluation device for a variable-speed centrifugal chiller according to claim 1, comprising a display section that displays the planned COP calculated by the arithmetic unit together with a current actual COP.

6. A variable-speed centrifugal chiller in which the performance evaluation device for a variable-speed centrifugal chiller according to claim 1 is mounted on a control board.

* * * * *